United States Patent Office 3,318,916
Patented May 9, 1967

3,318,916
PROCESS FOR THE PREPARATION OF SUBSTITUTED TETRAHYDROFURANS
Edward C. Leonard, Jr., Plainfield, N.J., assignor to Union Carbide Corporation, a corporation of New York
No Drawing. Filed July 5, 1963, Ser. No. 293,175
9 Claims. (Cl. 260—346.1)

This invention relates to novel tetrahydrofurans. More particularly, it relates to novel substituted tetrahydrofurans and to methods for synthesizing these novel tetrahydrofurans.

Tetrahydrofuran has been used widely in the chemical and allied industries both as an intermediate for the production of organic chemicals and more importantly as a solvent. Its solvent properties, attributable to its cyclic ether structure, place it in that unique class of compounds which will dissolve a variety of high molecular weight thermoplastic polymers and resinous substances. Tetrahydrofuran has also been used as an extractant of certain important chemical constituents of natural products such as the alkaloids. However, despite these superior properties the use of tetrahydrofuran has been curtailed because of its high cost relative to solvents in general. This cost factor is determined by its source material, viz., furfural, which in turn is obtained from corncobs and oatmeal hulls.

It is an object of this invention to provide substituted tetrahydrofurans. It is another object to provide an economical process for the synthesis of substituted tetrahydrofurans.

It now has been found that a series of substituted tetrahydrofurans can be prepared from chemical intermediates rather than from natural products. These tetrahydrofurans are thus cheaper and yet still retain the desirable solvent powers of the parent tetrahydrofuran. For example, these substituted tetrahydrofurans dissolve polystyrene, polyethylene and other thermoplastic polymers, solutions of which can be utilized in preparing printing inks, lacquers, adhesive formulations for cementing plastic films and protective coatings.

The basis of this method is the discovery that an olefinic aldehyde, having the general structure (I)
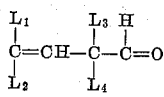

wherein $L_1$ and $L_2$ are each monovalent radicals such as hydrogen or alkyl radicals, preferably containing 1 to 4 carbon atoms and $L_3$ and $L_4$ are each monovalent alkyl radicals, preferably containing 1 to 4 carbon atoms, can undergo an intramolecular cyclization in the presence of a reactive or inert diluent and an acid catalyst.

The substituted tetrahydrofurans of this invention are cyclic ethers in one instance having the structure (II)
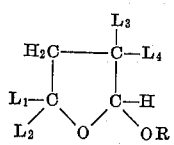

wherein $L_1$, $L_2$, $L_3$ and $L_4$ are as defined above and R, which is related to the reactive diluent employed in the reaction, is an organic monovalent radical preferably a member selected from the group consisting of hydrogen, alkyl radicals containing from 1 to 18 carbon atoms, alicyclic radicals containing from 5 to 7 carbon atoms, araliphatic radicals containing from 7 to 10 carbon atoms, halogen substituted alkyl radicals containing from 1 to 4 carbon atoms, alkoxyalkyl radicals containing from 2 to 8 carbon atoms, alkenyl radicals containing 2 to 18 carbon atoms, an acyl radical and a tetrahydrofuryl radical. Thus, for instance when the diluent is an alcohol (ROH), such as methanol, R is methyl. In like manner R is $-CH_2CH_2Br$ in $HO-CH_2CH_2Br$, $-CH_2CH_2OCH_3$ in $HO-CH_2CH_2OCH_3$, $-COCH_3$ in $CO_2HCH_3$, H in $H_2O$ and so forth.

Saturated alcohols which can be used as reactive diluents in this invention include: ethyl, n-propyl, isopropyl, n-butyl, isobutyl, tert-butyl, sec-amyl, sec-n-octyl, n-decyl, lauryl, cetyl, alcohols and others. Alicyclic alcohols which can be used include: cyclopentanol, cyclohexanol and cycloheptanol. Araliphatic alcohols which can be used include: benzyl, β-phenylethyl, benzohydrol, cinnamyl, salicyl, anisyl and coniferyl alcohols. In addition, heterocyclic alcohols such as furfuryl and tetrahydrofurfuryl alcohols can also be used.

Monobasic aliphatic acids which can be used include: propionic, pelargonic, and oleic acids.

Further reaction of the substituted tetrahydrofurans yields other products. For example through dehydrohalogenation a vinyl ether is produced.

(III)
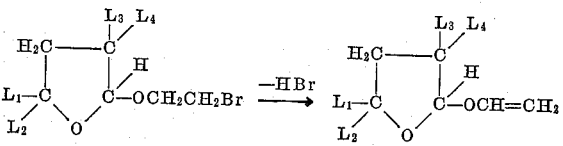

Other unsaturated ethers may be synthesized from unsaturated alcohols such as allyl, methallyl, crotonyl, oleyl, linoleyl and propargyl alcohols and citronellol and gernaiol and the like.

Still other substituted tetrahydrofurans can be prepared having a halogen-substituent in the 5 position.

(IV)
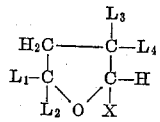

wherein $L_1$, $L_2$, $L_3$ and $L_4$ are as above, and X is F, Cl, Br or I, by reacting the olefinic aldehyde I with a stoichiometric amount of a hydrogen halide in the presence of an inert diluent.

These inert diluents differ from the reactive diluents in lacking an active hydrogen and include dialkyl ethers such as diethyl ether, dipropyl ether, dibutyl ether; cyclic ethers such as dioxane and pyran; aliphatic hydrocarbons such as, pentane, hexane, heptane and octane; and aromatic hydrocarbons such as benzene, toluene and xylenes.

Many branched olefinic aldehydes undergo this cyclization including the following:

2,2-dimethyl-2-butenal
2-methyl-2-ethyl-2-butenal
2,2-diethyl-3-butenal
2-methyl-2-vinylpentanal
2-methyl-2-vinylhexanal
2,2,4-trimethyl-3-butenal
2,2,4-trimethyl-3-pentanal
2,2-dimethyl-3-hexanal
2,2-trimethyl-3-hexenal
2,2-dimethyl-4-ethyl-3-hexanal
2,2-dimethyl-4-ethyl-3-heptenal
2,2-dimethyl-4-propyl-3-heptenal
2-methyl-2-ethyl-3-pentenal
2,4-dimethyl-2-ethyl-3-pentenal
2,2-diethyl-4-methyl-3-pentenal
2,2-diethyl-4-methyl-3-hexenal, and
2,2,4-triethyl-3-hexenal A preferred olefinic aldehyde is 2,2,4-trimethyl-3-pentenal,

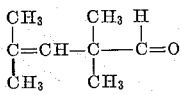

In addition to having the chemical structure requisite for cyclization, it is easily prepared by an aldol condensation from isobutyraldehyde, a cheap, readily available chemical intermediate. Starting from 2,2,4-trimethyl-3-pentenal and an alcohol solvent the cyclized product is an alkoxy tetrahydrotetramethylfuran having the general formula

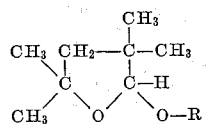

wherein R is as defined previously.

Although strong acids generally function as the cyclization catalyst, for processes leading to an —OR substituent in the 5 position sulfuric acid has been found to be a preferred acid. However, other acids which can be used include orthophosphoric acid, p-toluenesulfonic acid, and $BF_3$.

The catalyst concentration is not critical and can be used in the range of 0.1% to 2.0% by weight or higher or lower percentages based on the total charge.

The following examples demonstrate the synthesis of specific tetrahydrofurans but are only illustrative of this invention and are not intended to delimit ranges of operation. All percentages and parts herein are by weight unless otherwise specified. Analyses for the elements carbon and hydrogen were obtained by microanalysis and molecular weights were determined by an ebullioscopic method in benzene.

*Example 1.—Preparation of tetrahydrotetramethylfurans*

In a one-liter, three-neck round-bottom flask fitted with a thermometer, stirrer and reflux condenser there were placed 40 g. of 2,2,4-trimethyl-3-pentenal, 250 cc. of acetic acid and 5 cc. of sulfuric acid. The reaction mixture was stirred for 15 hours at 25–30° C. The reaction mixture was then poured into water and extracted with diethyl ether in a separatory funnel. The lower layer was discarded and the upper, ether layer was washed with an aqueous 10% sodium carbonate solution, followed by successive washes with water until the wash water showed a neutral reaction with litmus paper. The ether solution was then dried over anhydrous magnesium sulfate. The ether was removed by distillation at atmospheric pressure and the residue subjected to fractionation by vacuum distillation. There was thus obtained 24 g. (53% yield based on the aldehyde charge) of 5,5'-oxybis(tetrahydro-2,2,4,4-tetramethyl)furan having a boiling point of 83–85° C./11 mm. and a melting point of 56–57° C. The following analytical data were obtained. Percent carbon: Calculated, 71.11; found, 71.34. Percent hydrogen: Calculated, 11.11; found, 11.25. Molecular weight: Calculated, 270; found, 278, 285.

Two additional lower boiling fractions were also isolated from the reaction product. The first, 5-acetoxy-tetrahydro-2,2,4,4-tetramethylfuran (25% yield), had a boiling point of 58–60° C./2 mm. Percent carbon: Calculated, 64.43; found, 64.14. Percent hydrogen: Calculated, 9.67; found, 9.53. The second low boiling fraction, 5-hydroxy-tetrahydro-2,2,4,4-tetramethylfuran (15% yield) had a boiling point of 56° C./4 mm. Its identity was established by its nuclear magnetic resonance spectrum.

*Example 2.—Preparation of 5-chlorotetrahydro-2,2,4,4-tetramethylfuran*

A solution consisting of 52 g. of 2,2,4-trimethyl-3-pentenal in 250 cc. of diethyl ether was introduced into a one-liter, round-bottom, three-neck flask equipped with a mechanical stirrer, reflux condenser, thermometer and gas inlet tube. Anhydrous hydrogen chloride was bubbled into the solution for two hours. An exothermic reaction ensued causing the reaction mixture to reflux. Without further treatment the ether was removed by distillation and the reaction residue fractionally distilled under vacuum. The main fraction consisting of 5 g. of 5-chloro-tetrahydro-2,2,4,4-tetrahydrofuran boiling at 94° C./40 mm. was identified by its nuclear magnetic resonance spectrum.

*Example 3.—Preparation of 5-alkoxytetrahydro-2,2,4,4-tetramethylfurans*

The method used for the preparation of the 5-alkoxy-tetrahydro-2,2,4,4-tetramethylfurans is exemplified by that used in synthesizing 5-methoxytetrahydro-2,2,4,4-tetramethylfuran.

In a 3-neck, round-bottom flask equipped with a mechanical stirrer, thermometer and reflux condenser were placed 126 g. (1 mole) of 2,2,4-trimethyl-3-pentenal, 640 g. (20 moles) of methanol and 5 g. of sulfuric acid. The mixture was refluxed at 65° C. for 12 hours after which the excess methanol was stripped off and the 5-methoxytetrahydro-2,2,4,4-tetramethylfuran, obtained in a 65% yield (91 g.) by distillation. This product had a boiling point of 146° C. at atmospheric pressure and an $n_D{}^{25}=1.4144$. The analysis for carbon and hydrogen revealed—percent carbon: Calculated, 69.00; found, 69.56. Percent hydrogen: Calculated, 11.40; found, 11.65.

Pertinent physical and analytical data relative to the preparation of all of the alkoxy furans is presented in the table below. The column headed, "Alkoxy group" serves to identify each of the homologs of this series of 5-alkoxytetrahydro-2,2,4,4-tetramethylfurans.

PREPARATION OF 5-ALKOXYTETRAHYDRO-2,2,4,4-TETRAMETHYLFURANS

| No. | 5-Alkoxy Group | Reactants | | $H_2SO_4$, g. | Yield percent | Product | | Percent Carbon | | Percent Hydrogen | |
| | | Alcohol | Aldehyde, g. | | | Boiling point, °C./mm. | $n_D{}^{25}$ | Calc. | Found | Calc. | Found |
|---|---|---|---|---|---|---|---|---|---|---|---|
| 1 | Methoxy | Methanol, 640 g | (¹) 126 | 5 | 65 | 146/760 | 1.4144 | 69.00 | 69.56 | 11.40 | 11.65 |
| 2 | Ethoxy | Ethanol, 632 g | (¹) 126 | 5 | 75 | 68–76/45 | 1.4157 | 69.77 | 69.99 | 11.63 | 11.70 |
| 3 | Isopropoxy | Isopropanol, 635 g | (¹) 126 | 5 | 73 | 84/37 | | 70.96 | 71.15 | 11.83 | 11.68 |
| 4 | n-Butoxy | n-Butanol, 648 g | (¹) 126 | 5 | 44 | 102–105/38 | 1.4216 | 72.00 | 72.80 | 12.00 | 12.32 |
| 5 | 2-methylethoxy | 2-methoxyethanol, 776 g. | (¹) 126 | 5 | 63 | 34/0.2 | 1.4244 | 65.34 | 65.60 | 10.89 | 11.07 |
| 6 | 2-bromoethoxy | 2-bromoethanol, 1,416 g. | (¹) 126 | 5 | 70 | 69–74/2 | 1.4569 | 47.63 | 48.11 | 7.55 | 7.35 |

¹ 2,2,4-trimethyl-3-pentenal.

*Example 4.—Preparation of 5-vinyloxytetrahydro-2,2,4,4-tetramethylfuran*

A one-liter, round-bottom flask equipped with a 5 inch Claisen distillation column and head was charged with 144 g. (0.55 mole) of 5-(2-bromoethoxy)tetrahydro-2,2,4,4-tetramethylfuran (Example 3, No. 6) and 144 g. (3.6 moles) of sodium hydroxide pellets. After heating for 4 hours at 190 to 220° C., the mixture was vacuum distilled. The distillate, amounting to 68 g. of a mixture of water and crude product was placed in a separatory funnel where the organic layer was isolated.

Drying of the organic fraction over anhydrous magnesium sulfate followed by vacuum distillation afforded 28 g. (35% yield) of 5-vinyloxytetrahydro-2,2,4,4-tetramethylfuran, having a boiling point of 79–81° C./43 mm. and a $n_D^{25}$ of 1.4296. Percent carbon: calculated, 70.58; found, 70.57. Percent hydrogen: calculated, 10.58; found, 10.67.

*Example 5.—Solubility determination*

The solvent power of the substituted alkoxy tetrahydrofurans was demonstrated by shaking a 100 cc. sample of 5-methoxytetrahydro-2,2,4,4-tetramethylfuran prepared by the method described in Example 3 with 2 g. of polystyrene having a number average molecular weight of about 50,000 in a stoppered 250 ml. Erlenmeyer flask. A clear solution was obtained after shaking for 5 hours at 100° C. indicating complete solubility in this solvent. Similar results were obtained with polyethylene having a density of 0.92 in this same solvent.

As indicated by the foregoing examples, temperature and pressure are not critical in the method of the present invention. Atmospheric, subatmospheric and superatmospheric pressures can be used. The reactions are ordinarily carried out at a temperature between about 0° C. and about 150° C. or higher or lower. Preferably atmospheric pressures are used and a temperature range from 20° C. to 100° C. The lower range of the foregoing ranges is preferred when preparing the 5-halogen substituted tetrahydrofurans.

What is claimed is:

1. A process for the preparation of a tetrahydrofuran having the formula

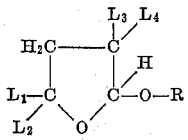

wherein $L_1$ and $L_2$ are monovalent radicals selected from the group consisting of hydrogen and alkyl containing 1 to 4 carbon atoms, $L_3$ and $L_4$ are alkyl containing 1 to 4 carbon atoms, R is a monovalent radical selected from the group consisting of hydrogen, alkyl containing 1 to 8 carbon atoms, chlorine substituted alkyl containing 1 to 4 carbon atoms, bromine substituted alkyl containing 1 to 4 carbon atoms, iodine substituted alkyl containing 1 to 4 carbon atoms, alkoxyalkyl containing 2 to 8 carbon atoms, vinyl and acetyl, which comprises contacting an unsaturated aliphatic aldehyde having the structure

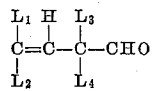

wherein $L_1$, $L_2$, $L_3$, and $L_4$ are as defined above, with an acid catalyst in the presence of a reactant selected from the group consisting of unsubstituted monobasic aliphatic acids containing 2 to 18 carbon atoms, unsubstituted aliphatic alcohols containing 1 to 8 carbon atoms, aliphatic alcohols containing 1 to 4 carbon atoms and a halogen substituent selected from tthe group consisting of chlorine, bromine and iodine, and furfuryl alcohol, at a temperature of about 20° C. to 100° C.

2. Process claimed in claim 1 wherein the unsaturated aldehyde is 2,2,4-trimethyl-3-pentenal.

3. Process claimed in claim 1 wherein the monobasic aliphatic acid is acetic acid.

4. Process claimed in claim 1 wherein the reactant is an unsubstituted aliphatic alcohol containing 1 to 8 carbon atoms.

5. Process claimed in claim 1 wherein the reactant is an aliphatic alcohol containing 1 to 4 carbon atoms and a halogen substituent selected from the group consisting of chlorine, bromine and iodine.

6. Process claimed in claim 1 wherein the reactant is furfuryl alcohol.

7. Process for the preparation of halogenated tetrahydrofurans having the formula

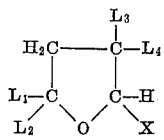

wherein $L_1$ and $L_2$ are monovalent radicals selected from the group consisting of hydrogen and alkyl containing 1 to 4 carbon atoms, $L_3$ and $L_4$ are alkyl containing 1 to 4 carbon atoms, and X is a halogen selected from the group consisting of chlorine, bromine and iodine, which comprises contacting an unsaturated aliphatic aldehyde having the structure

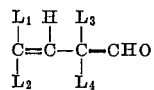

wherein $L_1$, $L_2$, $L_3$, and $L_4$ are as defined above, with a hydrogen halide selected from the group consisting of HCl, HBr, and HI, in the presence of an inert diluent at a temperature of about 20° C. to 35° C.

8. Process claimed in claim 7 in which the unsaturated aldehyde is 2,2,4-trimethyl-3-pentenal.

9. Process claimed in claim 7 in which the hydrogen halide is HCl.

References Cited by the Examiner

UNITED STATES PATENTS 3,184,480   5/1965   McConnell et al. _____ 260—347.4

OTHER REFERENCES

Colonge et al.: Bull. Chim. Soc. (France), 1948, pp. 939–45.

Colonge et al.: Bull. Chim. Soc. (France), 1959, pp. 939–945.

ALEX MAZEL, *Primary Examiner.*

HENRY R. JILES, JAMES H. TURNIPSEED, *Assistant Examiners.*